(12) United States Patent  
Stuart et al.

(10) Patent No.: US 9,112,845 B2
(45) Date of Patent: Aug. 18, 2015

(54) MOBILE APPLICATION FOR ACCESSING A SHAREPOINT® SERVER

(71) Applicants: Andrew Stuart, Rydal, PA (US); Thomas Kaminski, Lawrenceville, NJ (US)

(72) Inventors: Andrew Stuart, Rydal, PA (US); Thomas Kaminski, Lawrenceville, NJ (US)

(73) Assignee: R-Squared Services & Solutions, Princeton, NJ (US)

( * ) Notice: Subject to any disclaimer, the term of this patent is extended or adjusted under 35 U.S.C. 154(b) by 122 days.

(21) Appl. No.: 13/947,395

(22) Filed: Jul. 22, 2013

(65) Prior Publication Data

US 2014/0026190 A1    Jan. 23, 2014

Related U.S. Application Data

(60) Provisional application No. 61/673,984, filed on Jul. 20, 2012.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 29/08* | (2006.01) |

(52) U.S. Cl.
CPC .............. *H04L 63/08* (2013.01); *H04L 67/02* (2013.01); *H04L 67/34* (2013.01)

(58) Field of Classification Search
CPC .......... H04L 67/34; H04L 63/08; H04L 67/02
USPC ............................................................ 726/3
See application file for complete search history.

(56) References Cited

U.S. PATENT DOCUMENTS

| | | | |
|---|---|---|---|
| 2003/0046401 A1* | 3/2003 | Abbott et al. ................ 709/228 |
| 2010/0070448 A1* | 3/2010 | Omoigui ......................... 706/47 |
| 2011/0225417 A1* | 9/2011 | Maharajh et al. ............. 713/150 |
| 2012/0221955 A1* | 8/2012 | Raleigh et al. ................ 715/736 |

* cited by examiner

*Primary Examiner* — Kambiz Zand
*Assistant Examiner* — Benjamin Kaplan
(74) *Attorney, Agent, or Firm* — Carol E. Thorstad-Forsyth, Esq.; Fox Rothschild LLP

(57) ABSTRACT

A method of and a mobile processing device for accessing a web application platform. The method includes installing an application configured to access a server hosting the web application platform, configuring the application, wherein configuring comprises generating at least one of a data capture list and a data lookup list available to the application, transferring authentication information to the server, receiving an indication of which application configurations the application is permitted to access based upon the authentication information, and displaying a set of one or more icons related to the application configurations the application is permitted to access. The mobile processing device includes various hardware components for performing the method.

14 Claims, 3 Drawing Sheets

MOBILE APPLICATION FOR ACCESSING A SHAREPOINT® SERVER

CROSS REFERENCE TO RELATED APPLICATIONS

This application claims the priority benefit of U.S. Provisional Application No. 61/673,984 entitled "Mobile Application for Accessing a Sharepoint® Server" and filed Jul. 20, 2012, the content of which is hereby incorporated by reference in its entirety.

This application is also related to U.S. patent application Ser. No. 12/699,398 filed Feb. 3, 2010 and entitled "Dynamic Linking in SHAREPOINT™" and U.S. patent application Ser. No. 12/952,296 filed Nov. 23, 2010 and entitled "Method and System for Adding Combination Fields to SHAREPOINT™." The contents of both these related applications are hereby incorporated by reference in their entireties.

FIELD OF THE INVENTION

This invention generally relates to the Microsoft SharePoint® platform, and more particularly, to accessing standard Microsoft SharePoint® technology via an application installed and run on a portable computing device.

BACKGROUND

Microsoft SharePoint® is a family of software products developed by Microsoft Corporation for collaboration, file sharing and web publishing. The Microsoft SharePoint® Server is one of these products.

As depicted in FIG. 1, a Microsoft SharePoint® Server (hereinafter, "Server") is generally composed of three major tiers or logical layers: 1.) a Web Front End layer 102 which processes HTTP requests to the Server; 2.) An application layer 104 which provides such features as Search and Excel Services; and, 3.) A dedicated Microsoft SQL Server data storage 106.

While SharePoint® users can access SharePoint® functionality through multiple methods, the primary user interface is a web-based application accessed through a browser. The majority of SharePoint®'s functionality is supported across all major desktop web browsers.

SharePoint® can also be accessed through: a Windows-based synchronized desktop client, Windows 7 Federated Search, WebDAV "Internet folders" (i.e. via Windows Explorer), Microsoft Outlook, Microsoft Office 2010, and other third party applications. Corporate directory security restrictions may be applied at a granular level, enabling SharePoint® sites to be internet-facing, intranet-facing, or both.

However, with the power and convenience of portable computing devices such as tablet computers increasing, mobile applications directed to a specific function are increasing as well. Mobile applications are typically designed and coded to solve very specific problems or perform very specific functions. For example, an email application is only capable of handling email, and if one were to inspect the source code for such an application he would see explicit references to "subject", "from" and "to" data fields, SMTP protocols, and email servers. This specializations forces a company to purchase many different specialized applications and results in high third party software costs as these applications are acquired.

SUMMARY

The present disclosure concerns systems, devices and methods related to optical modulation devices, and more particularly to resonator-based optical modulators. For example, in one scenario, a method of accessing a web application platform from a mobile processing device includes installing an application configured to access a server hosting the web application platform; configuring the application, wherein configuring comprises generating at least one of a data capture list and a data lookup list available to the application; transferring authentication information to the server; receiving an indication of which application configurations the application is permitted to access based upon the authentication information; and displaying a set of one or more icons related to the application configurations the application is permitted to access.

In a second scenario, a mobile processing device for accessing a web application platform includes a processor, a display operably connected to the processor, and a non-transitory computer readable medium operably connected to the processor. The computer readable medium contains set of instructions configured to instruct the processor to install an application configured to access a server hosting the web application platform, configure the application, wherein configuring comprises generating at least one of a data capture list and a data lookup list available to the application, transfer authentication information to the server, receive an indication of which application configurations the application is permitted to access based upon the authentication information, and output, on the display, a set of one or more icons related to the application configurations the application is permitted to access.

DETAILED DESCRIPTION

Figure 1:
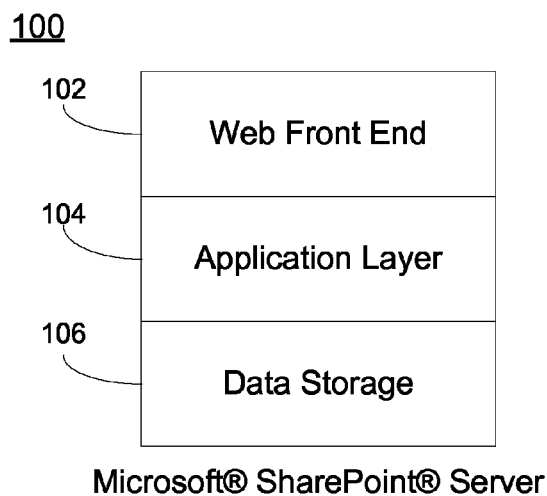
FIG. 1 is a block diagram depicting the organization of memory layers in a typical prior art Microsoft SharePoint® Server.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the disclosure may be combined in any suitable manner in one or more embodiments. One skilled in the relevant art will recognize, in light of the description herein, that the teachings of the disclosure made herein can be practiced without one or more of the specific features or advantages of a particular embodiment. In other instances, additional features and advantages may be recognized in certain embodiments that may not be present in all embodiments of the disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Reference throughout this specification to "one embodiment", "an embodiment", or similar language means that a particular feature, structure, or characteristic described in connection with the indicated embodiment is included in at least one embodiment of the present disclosure. Thus, the phrases "in one embodiment", "in an embodiment", and similar language throughout this specification may, but do not necessarily, all refer to the same embodiment.

The present invention utilizes a computer system, in addition to the method and data structures as described herein, having a minimal configuration of at least one processor and associated computer memory, the processor and memory configured to operate as a web application platform configured to provide content and document management as well as a multipurpose set of web technologies configured for one or more organizations, the technologies generally backed by a common infrastructure. An example of such a web application platform is Microsoft SharePoint® Server providing Microsoft SharePoint® Services. Reference herein to "Microsoft SharePoint® Services" or simply "SharePoint®" assumes the use of a Microsoft SharePoint® Server. The computer memory is configured with processor instructions and data which, when loaded into the processor, cause the processor to execute the methods of the invention.

The Microsoft SharePoint® Server computer system may alternatively be comprised of several processors with associated computer memory, as is well understood in the art.

An embodiment of the present invention advantageously provides for producing complex data structure items in a Microsoft SharePoint® platform application, whereby one data item contains within a single data field multiple sets of reference data.

FIG. 1 depicts a simplified exemplary memory schematic 100 of the software layers for a prior art Microsoft SharePoint® Server. A typical Microsoft SharePoint® Server includes a web front end 102, an application layer 104, and data storage 106. The web front end 102 layer processes HTTP requests to the Microsoft SharePoint® Server. The data storage 106 layer provides a data repository. The application layer 104 is where SharePoint® applications reside.

Figure 2:
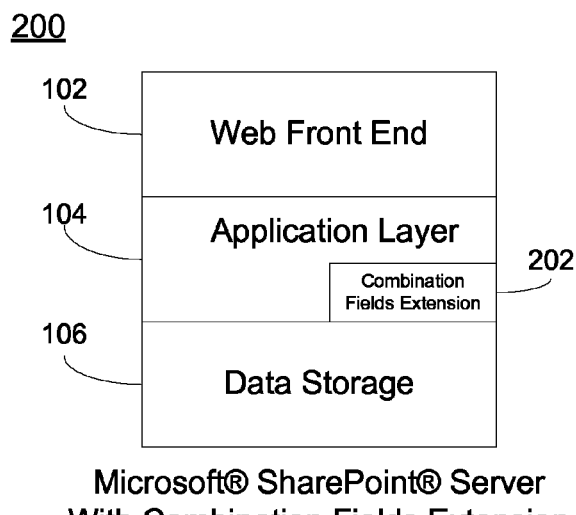
FIG. 2 is a block diagram depicting the organization of memory layers in a Microsoft SharePoint® Server with the combination fields extensions, in accordance with an embodiment of the present invention.

FIG. 2 depicts a simplified exemplary memory schematic 200 of the software layers in an embodiment of the invention. The web front end 102 and data storage 106 layers operate as in FIG. 1. However, the application layer 104 includes the necessary support for the inventive combination fields extension 202.

The server as illustrated in FIGS. 1 and 2 may be configured to run a specific application such as the RADS® system described in application Ser. Nos. 12/699,398 and 12/952,296. However, the present disclosure provides a configurable mobile access point to the client's server-based RADS® systems. The intent of the application is to enhance a user experience for users of the RADS® Platform when connecting to the application from portable computing de vice such as a table computer. The application may effectively mirror and/or enhance existing business processes for the largest possible base of users and greatly enhance the value of the RADS® infrastructure for clients. A desired result of the mobile interface is primarily for data capture and review/approval of information within RADS®.

The mobile application as described herein takes a new approach to mobile application design by reading its configuration dynamically from a Microsoft SharePoint® Services list. None of the data capabilities are "hard coded" into the application, but are instead controlled by the configurations stored within SharePoint®, which allows for the application to be easily customized for specific clients as well as for specific users. When a user first starts the application, they are prompted to provide credentials and a server URL. The application then connects to the server and, once authenticated, it may connect to a configuration list and determines which configurations have been set up and enabled for that user. The configuration list is capable of holding virtually unlimited configurations for virtually unlimited users. For example, a user from the "Sales" group may receive a completely different configuration than a user from the "Compliance" group.

Each configuration may store information about which users or groups have access, what icons and graphics are used, the color schemes/branding used, effective/expiration dates for the configuration, how often data is refreshed, how long before a user session times out, what lists are enabled for data capture (add/update/delete) and what lists are enabled for lookup/reference (read only). For individual data lists, subqueries may be contained within the configurations and are used for each data capture or lookup list to filter the data, so only relevant data for that user or data for which that user has permissions to be accessible or displayed.

The configuration may also control how the portable computing device will render the data capture form. Fields present, label visibility, field placement, sorting, data visibility, and behavior can be controlled through the configuration. The configurations are completely dynamic and are wholly dependent on the data stored in the configuration list. As changes to configurations are made and the mobile application is connected, the appearance, functionality, and behavior of the application will change real-time to reflect the current configuration. Additional detailed related to the portable computing device and mobile application is presented in the following discussions of FIGS. 3 and 4.

Figure 3:
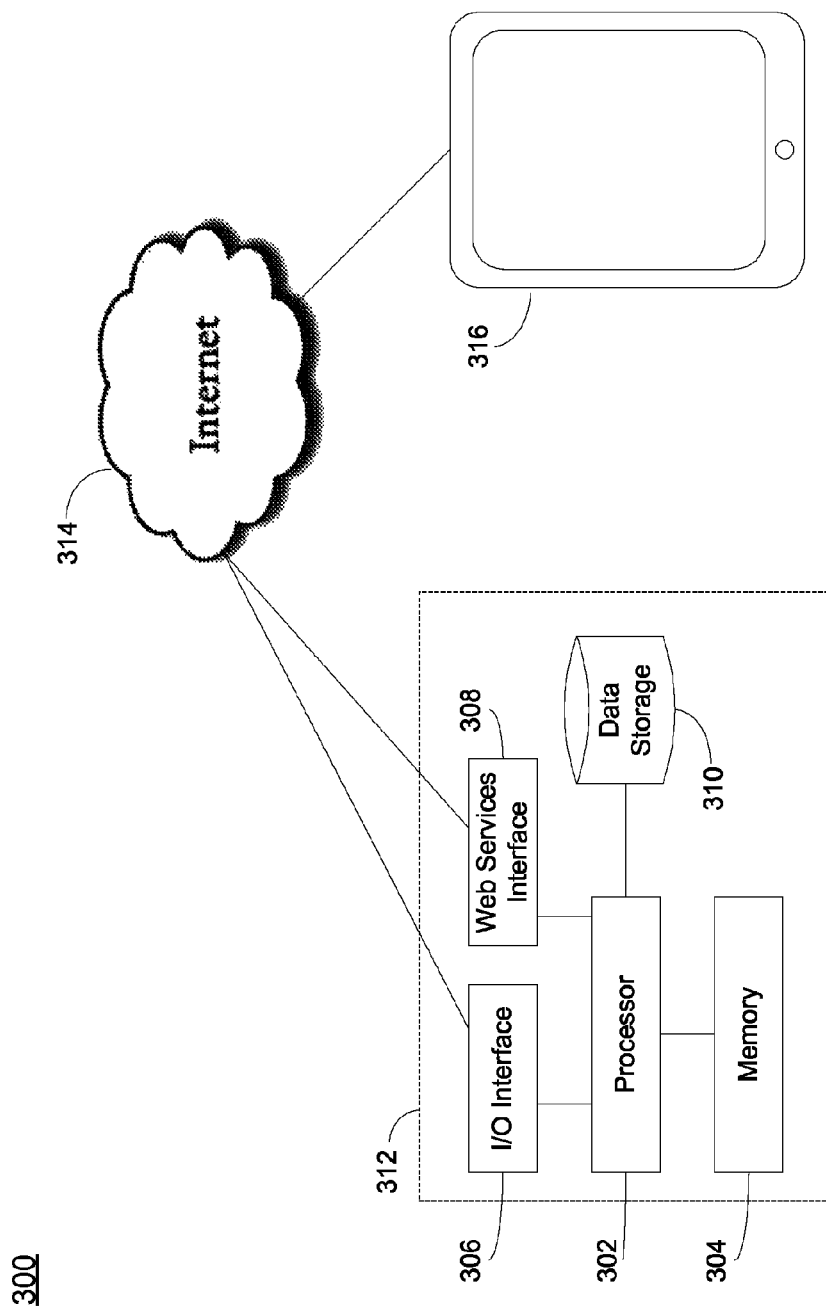
FIG. 3 is a block diagram depicting a typical system configuration in accordance with an embodiment of the present invention.

FIG. 3 is a block diagram depicting exemplary components of a system 300 employing the present invention. A SharePoint® Server 312 is provided, including a computer processor 302, associated computer memory 304, input/output interface 306, a web services interface 308 and data storage 310. In an embodiment of the invention, the server 312 is in communication with a network such as the Internet 314 via the I/O interface 306 and the web services interface 308, although alternatives to the Internet are envisioned, and even a stand-alone system may alternatively be deployed. A mobile computing device such as tablet computer 316 may be operably connected to the server 312 via the Internet 314.

The I/O interface 306 may be the interface with which a human user of the system interacts, presented as a graphical user interface on the tablet computer and constructed by the SharePoint® Server 312 as defined by a custom configuration by a software provider or management company. The web services interface 308 may be the computer interface through which the user's computing device (e.g., the tablet computer 316) interacts directly with the SharePoint® server 312. Specifically, a mobile application on the tablet computer 316 may be configured to connect to the server 312 via the web services interface 308 to access necessary back-end services running on the server 312.

Figure 4:
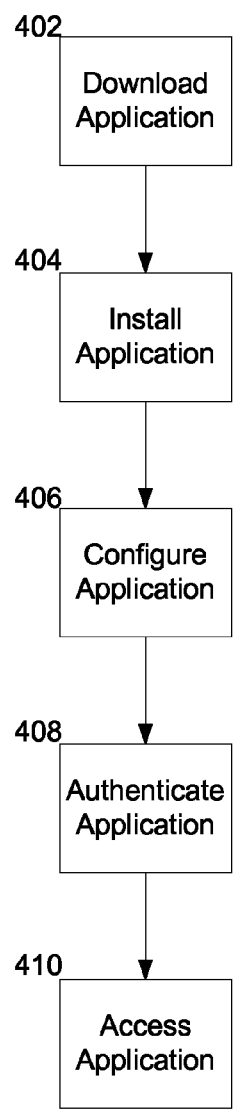
FIG. 4 depicts a flow chart of an example procedure for accessing a SharePoint® server via a tablet computer in accordance with an embodiment of the invention.

FIG. 4 depicts a flow chart illustrating an example procedure for accessing a server such as server 312 using a tablet computer such as tablet computer 316. The application may be downloaded 402 and installed 404 on the mobile device as per the mobile device platform standard deployment process. For security purposes, the end user may also require licensing information and have an initial server configuration performed on the customer's existing RADS®-based system.

To use the application, the application may be configured 406. A configuration list within the client's SharePoint® implementation may first be setup. In this list, an administrator will generate and configure what data capture lists and data lookup lists are available to the client application, along with the users and/or groups that have access to this specific configuration. The user may also be given credentials to access the SharePoint® site. For example, the configurations list may be created that will be used to store the various configurations that will be defined for the application. The data that is stored includes Configuration Name, Configuration icon, Effective Date, Operational Parameters, Configuration Enabled (Y/N), Expiration Date, Forced Update (Y/N), Online Only (Y/N), Refresh Data Frequency, Save User Credentials (Y/N), Specified Users, User Session timeout, Data Capture lists, and Data Lookup Lists.

After installation of the application on the mobile device per the mobile device platform requirements, the user then provides credentials and a server URL in order to authenticate 408 the application. After connecting, the application will display icons for the configurations enabled for that user as based upon the authentication of the application, thereby allowing the user to access 410 those configurations. The user can tap the icon to navigate into the configuration where he will be presented with the configured data capture lists. Tapping the list icon will open the list and present the user with the current data along with options to view, edit, or add new records.

On the mobile application platform (e.g., iOS or Android), the application may be created and coded so that it is able to:
Accept credentials and a server URL from the user
Given those credentials and URL, be able to connect to the server
Read the configurations list from the server and determine what configurations are available for this user.
Given the configurations, display icons to the user the for which data capture lists they have access to
Upon selection of a Data Capture List, connect to that SharePoint® list and render the contents while also creating a local cached copy of the data
Upon selection of a specific record, have code that can interpret each different supported SharePoint® field or RADS® custom field type and display that record and its data
Upon editing a record or creating a new record, have code that can interpret each different supported SharePoint® field or RADS® custom field type and allow for the display, update, or insert of data into that field.
The configuration also controls how the mobile device will render the data capture/display form. Fields present, label visibility, field placement, sorting, data visibility, and behavior can be controlled through the configuration.
When in an online/connected mode, be able to post back new or changed data and commit the data to the server as well as saved a local cached copy, and be able to indicate that data save was successful as well as call out any data conflicts that have occurred (server data has changed since it was downloaded and changed by the mobile user). Code may be written to handle the conflicting data.
When in an offline mode, allow a user to work with cached data in a similar manner and then allow for the resynchronization of data to the server once connected.
On the server-side, web services should be created to allow the mobile application code to connect to the server and transfer data. The web services need to be able to list, query, filter, sort, add, update, and delete data in the prescribed SharePoint® lists as specified in the configuration.

The application as described herein is different in that the application itself is not explicitly coded to provide any specific function or task; rather it connects to a server in order to read a configuration that describes what the application is able to do. An attractive feature of the present disclosure is that the application can be configured to interact with almost any server-based system, freeing the customer from having to purchase many limited use applications, as well as easily enabling mobile access to data and applications that might otherwise be less accessible. Thus, the application provides greater value to customers and end users in that only one application can be configured to access many different/disparate server based systems, where prior art would require many special use or special function applications to do the same tasks.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of accessing a web application platform from a mobile processing device, the method comprising:
installing, on the mobile processing device, a software application configured to access a remote server hosting the web application platform and which does not have hard coded data capabilities;
configuring, on the mobile processing device, the software application by generating at least one of a data capture list and a data lookup list available to the software application;
receiving user credentials and an internet address for the remote server hosting the web application platform from a user of the mobile processing device during a period of time subsequent to the mobile processing device's sale and distribution, where the user credentials and internet address are provided to facilitate a dynamic configuration or re-configuration of data capabilities of a software application installed on the mobile processing device;

transferring authentication information for the software application from the mobile processing device to the remote server;

receiving, by the mobile processing device, an indication of which data capabilities configurations were determined to have been set up for the software application based upon the authentication information and the user credentials;

dynamically configuring or re-configuring the data capabilities of the software application installed on the mobile processing device in accordance with the data capabilities configurations, where the data capabilities configurations specify at least one icon of a plurality of icons which may be displayed by the software application during a present session; and displaying on a display operably connected to the mobile processing device the icon specified by the data capabilities configurations.

2. The method of claim 1, wherein configuring the software application further comprises configuring a listing of users and groups that have access to particular application configurations.

3. The method of claim 2, further comprising presenting the user with the data capture list in response to a received indication of selection of at least one of a plurality of sets of icons.

4. The method of claim 1, wherein the data capture list or the data lookup list comprises at least one of configuration name, configuration icon, effective date, operational parameters, a configuration enabled query, expiration date, a forced update query, an online only query, refresh data frequency, a save user credentials query, specified users and a user session timeout.

5. The method of claim 1, further comprising:
receiving an indication of a user selection of a specific record from a set of icons;
rendering a content of the selected specific record on the mobile processing device; and
creating a local cached copy of the selected specific record.

6. The method of claim 5, further comprising displaying the selected specific record on the mobile processing device.

7. The method of claim 1, further comprising synchronizing data between the mobile processing device and the remote server when a connection is established between the mobile processing device and the remote server.

8. A mobile processing device for accessing a web application platform, the mobile processing device comprising:
a processor;
a display operably connected to the processor; and
a non-transitory computer readable medium operably connected to the processor, the computer readable medium containing a set of instructions configured to instruct the processor to:
install a software application on the mobile processing device, where the software application is configured to access a remote server hosting the web application platform and which does not have hard coded data capabilities,
configure the software application by generating at least one of a data capture list and a data lookup list available to the software application,
receive user credentials and an internet address for the remote server hosting the web application platform from a user of the mobile processing device, where the user credentials and internet address are provided to facilitate a dynamic configuration or re-configuration of data capabilities of a software application installed on the mobile processing device,
transfer authentication information for the software application to the remote server,
receive an indication of which data capabilities configurations were determined to have been set up for the software application based upon the authentication information and the user credentials,
dynamically configuring or re-configuring the data capabilities of the software application installed on the mobile processing device in accordance with the data capabilities configurations, where the data capabilities configurations specify at least one icon of a plurality of icons which may be displayed by the software application during a present session; and
output, on the display, the icon specified by the data capabilities configurations.

9. The mobile processing device of claim 8, wherein the set of instructions further instruct the processor to configure a listing of users and groups that have access to particular application configurations.

10. The mobile processing device of claim 9, wherein the instructions further cause the processor to present a user with the data capture lists in response to a received indication of selection of at least one set of icons.

11. The mobile processing device of claim 8, wherein the data capture list or the data lookup list comprises at least one of configuration name, configuration icon, effective date, operational parameters, a configuration enabled query, expiration date, a forced update query, an online only query, refresh data frequency, a save user credentials query, specified users and a user session timeout.

12. The mobile processing device of claim 8, wherein the instructions further cause the processor to:
receive an indication of a user selection of a specific record from a set of icons;
render a content of the selected specific record on the mobile processing device; and
create a local cached copy of the selected specific record.

13. The mobile processing device of claim 12, wherein the instructions further cause the processor to display the selected specific record on the mobile processing device.

14. The mobile processing device of claim 8, wherein the instructions further cause the processor to synchronize data between the mobile processing device and the remote server when a connection is established between the mobile processing device and the remote server.

* * * * *